US008675542B2

(12) United States Patent
Kim et al.

(10) Patent No.: US 8,675,542 B2
(45) Date of Patent: Mar. 18, 2014

(54) METHOD OF OPERATING RELAY STATION IN WIRELESS COMMUNICATION SYSTEM

(75) Inventors: Hak Seong Kim, Anyang-si (KR); Ki Jun Kim, Anyang-si (KR); Yujin Noh, Anyang-si (KR); Daewon Lee, Anyang-si (KR); Bong Hoe Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 793 days.

(21) Appl. No.: 12/588,725

(22) Filed: Oct. 26, 2009

(65) Prior Publication Data

US 2010/0103860 A1 Apr. 29, 2010

Related U.S. Application Data

(60) Provisional application No. 61/108,857, filed on Oct. 27, 2008, provisional application No. 61/117,957, filed on Nov. 26, 2008.

(30) Foreign Application Priority Data

Jul. 15, 2009 (KR) ........................ 10-2009-0064415

(51) Int. Cl.
*H04B 7/14* (2006.01)
*H04L 12/50* (2006.01)
(52) U.S. Cl.
USPC .......................................... 370/315; 370/360
(58) Field of Classification Search
USPC ....................................................... 370/315
See application file for complete search history.

(56) References Cited

U.S. PATENT DOCUMENTS

| 7,143,135 | B2 * | 11/2006 | Smith et al. ................... 709/204 |
| 7,660,279 | B2 * | 2/2010 | Brueck et al. ................. 370/328 |
| 8,165,521 | B2 * | 4/2012 | Kim et al. ......................... 455/7 |
| 8,204,018 | B2 * | 6/2012 | Chindapol et al. ............ 370/330 |
| 8,379,601 | B2 * | 2/2013 | Love et al. ..................... 370/334 |

(Continued)

FOREIGN PATENT DOCUMENTS

| CN | 1984494 A | 6/2007 |
| CN | 101150384 A | 3/2008 |

(Continued)

OTHER PUBLICATIONS

Kanchei (Ken) Loa, et al., "Pipeline HARQ in Multi-hop Relay System", IEEE 802.16 Broadband Wireless Access Working Group, [online], Mar. 15, 2007.

(Continued)

*Primary Examiner* — Guang Li
(74) *Attorney, Agent, or Firm* — McKenna Long & Aldridge LLP

(57) ABSTRACT

A method of operating a relay station in a wireless communication system is provided. The method includes operating in a first mode comprising a first sub-mode and a second sub-mode, in the first sub-mode a first downlink and a first uplink between a base station and the relay station being simultaneously activated, in the second sub-mode a second downlink and a second uplink between the relay station and a mobile station being simultaneously activated, and operating in a second mode comprising a third sub-mode and a fourth sub-mode, in the third sub-mode the first downlink and the second uplink being simultaneously activated, in the fourth sub-mode the first uplink and the second downlink being simultaneously activated.

7 Claims, 16 Drawing Sheets

(56) References Cited

U.S. PATENT DOCUMENTS

| | | | |
|---|---|---|---|
| 8,422,439 B2* | 4/2013 | Nimbalker et al. | 370/329 |
| 2003/0125067 A1 | 7/2003 | Takeda et al. | |
| 2005/0141593 A1 | 6/2005 | Pasanen et al. | |
| 2007/0086368 A1* | 4/2007 | Lee et al. | 370/313 |
| 2007/0133479 A1* | 6/2007 | Montojo et al. | 370/335 |
| 2007/0190934 A1* | 8/2007 | Kim et al. | 455/7 |
| 2008/0039011 A1* | 2/2008 | Chang et al. | 455/7 |
| 2008/0049718 A1* | 2/2008 | Chindapol et al. | 370/351 |
| 2008/0107062 A1* | 5/2008 | Viorel et al. | 370/315 |
| 2008/0113616 A1* | 5/2008 | Kim et al. | 455/7 |
| 2010/0080139 A1* | 4/2010 | Palanki et al. | 370/252 |
| 2012/0033603 A1* | 2/2012 | Seo et al. | 370/312 |

FOREIGN PATENT DOCUMENTS

| | | |
|---|---|---|
| DE | 10-2004-039674 A1 | 11/2005 |
| JP | 5-259956 A | 10/1993 |
| JP | 2003-258719 A | 9/2003 |
| JP | 2007-116703 A | 5/2007 |

OTHER PUBLICATIONS

Kanchei (Ken) Loa, Hang Zhang, et al., Pipeline HARQ in Multi-hop Relay System, IEEE 802.16 Broadband Wireless Access Working Group, [online], submitted Mar. 15, 2007 <URL:http://ieee802.org/16/relay/contrib/S80216j-07_185r2. pdf>.

* cited by examiner (a)

(b)

| Subframe | HARQ for Downlink transmission (Access link) | | | | | Relay DL Tx | Link utilization (DL or UL) | Link utilization (DL and UL) | Relay UL Rx | HARQ for Uplink transmission (Access link) | | | | |
|---|---|---|---|---|---|---|---|---|---|---|---|---|---|---|
| | SCH(n) | HP1 | HP2 | HP3 | HP4 | | | | | (n+4) | HP1 | HP2 | HP3 | HP4 |
| 0 | | | | | | 1 | 1 | 1 | 0 | | | | | |
| 1 | | | | | | 1 | 1 | 1 | 0 | | | | | |
| 2 | | | | | | 1 | 1 | 1 | 0 | | | | | |
| 3 | | | | | | 1 | 1 | 2 | 1 | | | | | |
| 4 | | | | | | 1 | 1 | 2 | 1 | | | | | |
| 5 | | | | | | 1 | 1 | 2 | 1 | | | | | |
| 6 | | | | | | 0 | 1 | 1 | 1 | | | | | |
| 7 | | | | | | 0 | 1 | 1 | 1 | | | | | |
| 8 | | | | | | 1 | 1 | 2 | 1 | | | | | |
| 9 | | | | | | 1 | 1 | 2 | 1 | | | | | |
| 10 | | | | | | 1 | 1 | 1 | 0 | | | | | |
| 11 | | | | | | 1 | 1 | 1 | 0 | | | | | |
| 12 | | | | | | 0 | 1 | 1 | 1 | | | | | |
| 13 | | | | | | 0 | 1 | 1 | 1 | | | | | |
| 14 | | | | | | 1 | 1 | 2 | 1 | | | | | |
| 15 | | | | | | 1 | 1 | 2 | 1 | | | | | |
| 16 | | | | | | 1 | 1 | 1 | 0 | | | | | |
| 17 | | | | | | 1 | 1 | 1 | 0 | | | | | |
| 18 | | | | | | 1 | 1 | 2 | 1 | | | | | |
| 19 | | | | | | 1 | 1 | 2 | 1 | | | | | |
| 20 | | | | | | 1 | 1 | 2 | 1 | | | | | |
| 21 | | | | | | 0 | 1 | 1 | 1 | | | | | |
| 22 | | | | | | 0 | 1 | 1 | 1 | | | | | |
| 23 | | | | | | 0 | 1 | 1 | 1 | | | | | |
| 24 | | | | | | 1 | 1 | 2 | 1 | | | | | |
| 25 | | | | | | 1 | 1 | 1 | 0 | | | | | |
| 26 | | | | | | 1 | 1 | 1 | 0 | | | | | |
| 27 | | | | | | 1 | 1 | 1 | 0 | | | | | |
| 28 | | | | | | 0 | 1 | 1 | 1 | | | | | |
| 29 | | | | | | 1 | 1 | 2 | 1 | | | | | |
| 30 | | | | | | 1 | 1 | 2 | 1 | | | | | |
| 31 | | | | | | 0 | 1 | 1 | 1 | | | | | |
| 32 | | | | | | 1 | 1 | 1 | 0 | | | | | |
| 33 | | | | | | 1 | 1 | 2 | 1 | | | | | |
| 34 | | | | | | 1 | 1 | 2 | 1 | | | | | |
| 35 | | | | | | 1 | 1 | 1 | 0 | | | | | |
| 36 | | | | | | 0 | 1 | 1 | 1 | | | | | |
| 37 | | | | | | 0 | 1 | 1 | 1 | | | | | |
| 38 | | | | | | 0 | 1 | 1 | 1 | | | | | |
| 39 | | | | | | 1 | 1 | 2 | 1 | | | | | |

SCH, PDCCH    Available transmission by HARQ Process

FIG. 15

| Subframe | HARQ for Downlink transmission (Access link) | | | | | Relay DL Tx | Link utilization (DL or UL) | Link utilization (DL and UL) | Relay UL Rx | HARQ for Uplink transmission (Access link) | | | | |
|---|---|---|---|---|---|---|---|---|---|---|---|---|---|---|
| | SCH(n) | HP1 | HP2 | HP3 | HP4 | | | | | (n+4) | HP1 | HP2 | HP3 | HP4 |
| 0 | | | | | | 1 | 1 | 2 | 1 | | | | | |
| 1 | | | | | | 0 | 0 | 0 | 0 | | | | | |
| 2 | | | | | | 1 | 1 | 2 | 1 | | | | | |
| 3 | | | | | | 0 | 1 | 1 | 1 | | | | | |
| 4 | | | | | | 1 | 1 | 2 | 1 | | | | | |
| 5 | | | | | | 1 | 1 | 1 | 0 | | | | | |
| 6 | | | | | | 1 | 1 | 2 | 1 | | | | | |
| 7 | | | | | | 0 | 0 | 0 | 0 | | | | | |
| 8 | | | | | | 1 | 1 | 2 | 1 | | | | | |
| 9 | | | | | | 1 | 1 | 2 | 1 | | | | | |
| 10 | | | | | | 1 | 1 | 2 | 1 | | | | | |
| 11 | | | | | | 0 | 0 | 0 | 0 | | | | | |
| 12 | | | | | | 1 | 1 | 2 | 1 | | | | | |
| 13 | | | | | | 0 | 1 | 1 | 1 | | | | | |
| 14 | | | | | | 1 | 1 | 2 | 1 | | | | | |
| 15 | | | | | | 1 | 1 | 1 | 0 | | | | | |
| 16 | | | | | | 1 | 1 | 2 | 1 | | | | | |
| 17 | | | | | | 0 | 0 | 0 | 0 | | | | | |
| 18 | | | | | | 1 | 1 | 2 | 1 | | | | | |
| 19 | | | | | | 1 | 1 | 2 | 1 | | | | | |
| 20 | | | | | | 1 | 1 | 2 | 1 | | | | | |
| 21 | | | | | | 0 | 0 | 0 | 0 | | | | | |
| 22 | | | | | | 1 | 1 | 2 | 1 | | | | | |
| 23 | | | | | | 0 | 1 | 1 | 1 | | | | | |
| 24 | | | | | | 1 | 1 | 2 | 1 | | | | | |
| 25 | | | | | | 1 | 1 | 1 | 0 | | | | | |
| 26 | | | | | | 1 | 1 | 2 | 1 | | | | | |
| 27 | | | | | | 0 | 0 | 0 | 0 | | | | | |
| 28 | | | | | | 1 | 1 | 2 | 1 | | | | | |
| 29 | | | | | | 1 | 1 | 2 | 1 | | | | | |
| 30 | | | | | | 1 | 1 | 2 | 1 | | | | | |
| 31 | | | | | | 0 | 0 | 0 | 0 | | | | | |
| 32 | | | | | | 1 | 1 | 2 | 1 | | | | | |
| 33 | | | | | | 0 | 1 | 1 | 1 | | | | | |
| 34 | | | | | | 1 | 1 | 2 | 1 | | | | | |
| 35 | | | | | | 1 | 1 | 1 | 0 | | | | | |
| 36 | | | | | | 1 | 1 | 2 | 1 | | | | | |
| 37 | | | | | | 0 | 0 | 0 | 0 | | | | | |
| 38 | | | | | | 1 | 1 | 2 | 1 | | | | | |
| 39 | | | | | | 1 | 1 | 2 | 1 | | | | | |

▤ SCH, PDCCH  ☐ Available transmission by HARQ Process

METHOD OF OPERATING RELAY STATION IN WIRELESS COMMUNICATION SYSTEM

CROSS-REFERENCE TO RELATED APPLICATIONS

This application claims the benefit of priority of U.S. Provisional Application No. 61/108,857 filed on Oct. 27, 2008, U.S. Provisional Application No. 61/117,957 filed on Nov. 26, 2008, and Korean Patent Application No. 10-2009-0064415 filed on Jul. 15, 2009, which are incorporated by reference in their entirety herein.

BACKGROUND

1. Field of the Invention

The present invention relates to wireless communications, and more particularly, to a method of operating a relay station in a wireless communication system.

2. Related Art

Wireless communication systems are widely spread all over the world to provide various types of communication services such as voice or data. In general, the wireless communication system is a multiple access system capable of supporting communication with multi-users by sharing available radio resources. Examples of the radio resource include a time, a frequency, a code, transmit power, etc. Examples of the multiple access system include a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system, etc. The radio resource is a time in the TDMA system, a frequency in the FDMA system, a code in the CDMA system, and a subcarrier and a time in the OFDMA system. A wireless communication system is a system supporting bidirectional communication. The bidirectional communication can be performed by using a time division duplex (TDD) mode, a frequency division duplex (FDD) mode, a half-frequency division duplex (H-FDD) mode, etc. The TDD mode uses a time resource to identify uplink transmission and downlink transmission. The FDD mode uses a frequency resource to identify uplink transmission and downlink transmission. The H-FDD mode uses a combination of a time resource and a frequency resource to identify uplink transmission and downlink transmission.

The wireless communication system includes a base station (BS) providing a service to a specific region (i.e., a cell). According to a characteristic of a wireless transmission technology, changes in a wireless environment have an effect on quality of signal transmitted. In particular, due to various factors in a surrounding environment, such as scatters, movement of a mobile station (MS), etc., a wireless channel changes over time. In addition, there is a restriction in terms of distance since reception power is rapidly decreased in proportion to a distance between wireless communication entities. Therefore, in general, the MS can communicate with the BS when the MS is located within the coverage of the BS. As such, due to several factors such as the scatters, a movement speed of the MS, a distance between transmission and reception, etc., a maximum transfer rate, a throughput of an intra-cell user, and a throughput of a whole cell are decreased between the BS and the MS. For example, when the MS is located in a cell boundary or when an obstacle such as a building exists between the MS and the BS, communication quality between the MS and the BS may not be satisfactory.

As an effort to overcome the aforementioned problem, several techniques are introduced to compensate for deterioration of signals transmitted between the BS and the MS, thereby obtaining a maximum transfer rate, throughput improvement, coverage expansion, etc. For this purpose, a wireless communication system may employ a relay station (RS). The RS can expand the coverage of the BS, and can improve a cell throughput.

According to functions of the RS, the RS can be classified into several types as follows.

TABLE 1

| function | L1 Relay | L2 Relay | L3 Relay | Pico/Femto Cell |
|---|---|---|---|---|
| RF function | X | X | X | X |
| Coder/Decoder and CRC | — | X | X | X |
| HARQ | — | X | X | X |
| Multiplex & Demultiplex of MAC SDU | — | X | X | X |
| Priority(Qos) handling | — | X | X | X |
| Scheduling | — | X | X | X |
| Outer ARQ | — | (X) | X | X |
| (Re)-Segmentation and concatenation | — | (X) | X | X |
| Header compression(ROHC) | — | — | — | X |
| Reordering of lower layer SDUs | — | — | — | X |
| In-sequence delivery of upper layer PDUs | — | — | — | |
| Duplicate detection of lower layer SDUs | — | — | — | X |
| Ciphering | — | — | — | X |
| System information broadcast | — | — | X | X |
| RRC Connection set-up and maintenance | — | — | X | X |
| Radio Bearers set-up and maintenance | — | — | — | X |
| Mobility function | — | — | X | |
| MBMS services control | — | — | — | X |
| Paging | — | — | — | X |
| QoS management | — | — | (X) | X |
| UE measurement reporting and control the reporting | — | — | (X) | X |
| NAS signalling handling | — | — | — | X |

Although the RS is classified into an L1 relay, an L2 relay, and an L3 relay in Table 1, this is for exemplary purposes only. The above classification is achieved according to a broad characteristic of the L1, L2, and L3 relays, and the terminology thereof is not limited thereto. By reference, Table 1 also provides a function of a femto cell or a pico cell. It is assumed that the femto cell or the pico cell supports all functions exemplified in Table 1. The L1 relay is an RS having an amplify and forward (AF) function as well as some additional functions. The L1 relay amplifies a signal received from a BS or an MS and delivers the amplified signal to the MS or the BS. The L2 relay is an RS having a decoding and forward (DF) function as well as a scheduling function. The L2 relay restores information by performing demodulation and decoding on a signal received from the BS or the MS, generates a signal by performing coding and modulation, and then delivers the generated signal to the MS or the BS. The L3 relay is an RS having a configuration similar to one cell. The L3 relay has the functions of the L2 relay and supports call access, release, and mobility functions.

The RS can transmit or receive data by using a radio resource. The radio resource that can be used by the RS includes a time resource, a frequency resource, a spatial resource, etc. The time resource is expressed by a subframe, a symbol, a slot, etc. The frequency resource is expressed by a subcarrier, a resource block, a component carrier, etc. The spatial resource is expressed by spatial multiplexing, an antenna, etc. Such a radio resource may be used in a dedicated or shared manner between the BS and the RS or between the RS and the MS.

The RS is a recently introduced concept, and has to support an MS devised without consideration of the RS. For example, although the RS is not considered in the long term evolution (LTE) standard, the RS has to support not only an MS conforming to the LTE-advance standard but also an MS conforming to the LTE standard.

SUMMARY

The present invention provides a method of effectively transmitting and receiving a signal by using a relay station (RS). The present invention also provides a method of operating an RS that can support a mobile station (MS) devised without consideration of the RS.

According to an aspect of the present invention, a method of operating a relay station in a wireless communication system is provided. The method includes operating in a first mode comprising a first sub-mode and a second sub-mode, in the first sub-mode a first downlink and a first uplink between a base station and the relay station being simultaneously activated, in the second sub-mode a second downlink and a second uplink between the relay station and a mobile station being simultaneously activated, and operating in a second mode comprising a third sub-mode and a fourth sub-mode, in the third sub-mode the first downlink and the second uplink being simultaneously activated, in the fourth sub-mode the first uplink and the second downlink being simultaneously activated.

According to another aspect of the present invention, a method of operating a relay station in a wireless communication system is provided. The method includes communicating with a base station through a backhaul link between the base station and the relay station, and communicating with a mobile station connected to the relay station through an access link between the relay station and the mobile station. The backhaul link and the access link are activated according to a specific rule.

According to yet another aspect of the present invention, a relay station is provided. The relay station includes a radio frequency (RF) unit for transmitting and receiving a radio signal, and a processor coupled to the RF unit. The processor operates in a first mode comprising a first sub-mode and a second sub-mode. In the first sub-mode a first downlink and a first uplink between a base station and the relay station is simultaneously activated. In the second sub-mode a second downlink and a second uplink between the relay station and a mobile station is simultaneously activated. The processor also operates in a second mode comprising a third sub-mode and a fourth sub-mode, in the third sub-mode the first downlink and the second uplink is simultaneously, activated, and in the fourth sub-mode the first uplink and the second downlink is simultaneously activated.

According to the present invention, there is provided a method of operating a relay station (RS) that can support not only a mobile station (MS) devised in consideration of the RS but also an MS devised without consideration of the RS. In addition, there is also provided a subframe configuration satisfying backward compatibility with respect to hybrid automatic repeat request (HARQ) defined by the long term evolution (LTE) standard.

BRIEF DESCRIPTION OF THE DRAWINGS

FIG. 14 and FIG. 15 show link usage efficiency depending on the number of hybrid automatic repeat request (HARQ) processes when a subframe is configured according to an embodiment of the present invention.

DESCRIPTION OF EXEMPLARY EMBODIMENTS

The technique described below can be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in a downlink and employs the SC-FDMA in an uplink.

For clarity of explanation, the following description will focus on the 3GPP LTE. However, the technical features of the present invention are not limited thereto.

Figure 1:
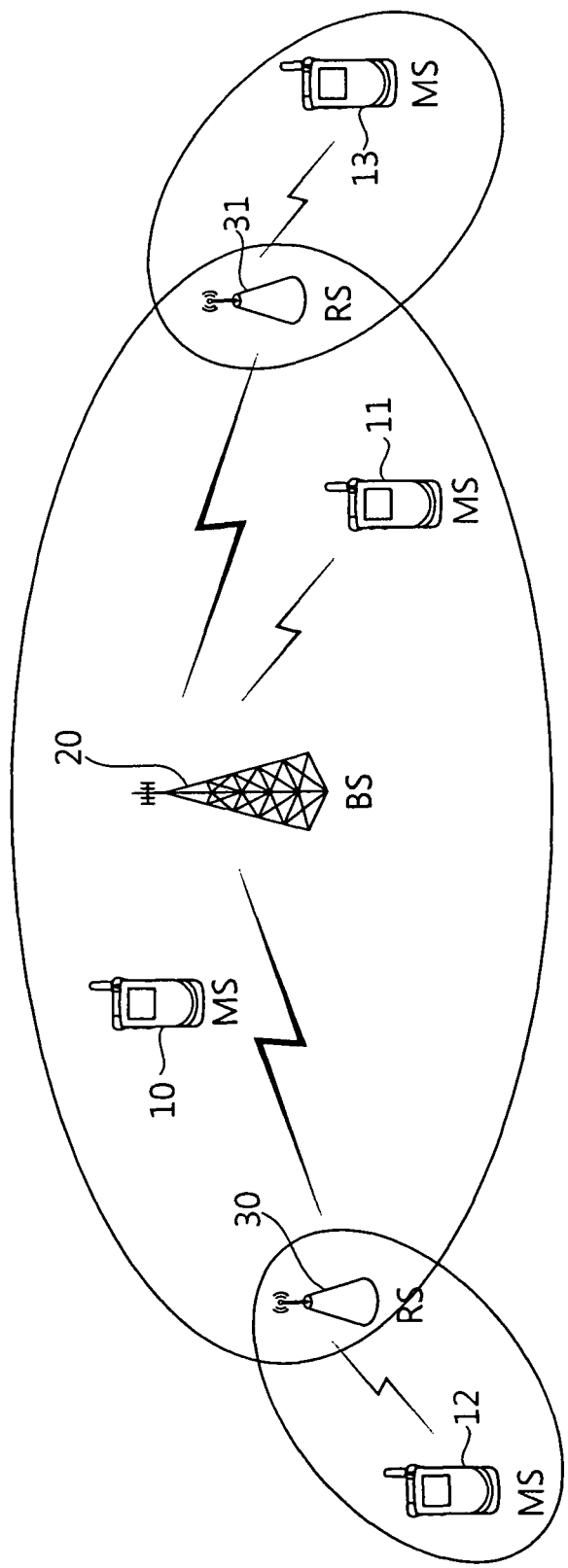
FIG. 1 is a diagram showing a wireless communication system employing a relay station (RS).

FIG. 1 is a diagram showing a wireless communication system employing a relay station. The wireless communication system can be widely deployed to provide a variety of communication services, such as voices, packet data, etc.

Referring to FIG. 1, the wireless communication system includes mobile stations (MSs) 10, 11, 12, and 13, a base station (BS) 20, and relay stations (RSs) 30 and 31. Each of the MSs 10, 11, 12, and 13 may be fixed or mobile, and may be referred to as another terminology, such as a user equipment (UE), a user terminal (UT), a subscriber station (SS), a wireless device, etc. The BS 20 is generally a fixed station that communicates with the MSs 10, 11, 12, and 13 and may be referred to as another terminology, such as a node-B (NB), a base transceiver system (BTS), an access point, etc. One or more cells may exist in the coverage of one BS 20. The RSs 30 and 31 are provided for coverage extension or data transfer rate improvement resulted from a diversity effect, and are located between the MS and the BS. The RS may be referred to as another terminology, such as a repeater, a relay, a relay node (RN), etc. That is, the MSs 10 and 11 located inside the coverage of the BS 20 can directly communicate with the BS 20, and the MSs 12 and 13 located outside the coverage of the BS 20 communicate with the BS 20 via the RSs 30 and 31. Alternatively, for the data transfer rate improvement resulted from the diversity effect, even the MSs 10 and 11 located inside the coverage of the BS 20 may communicate with the BS 20 via the RSs 30 and 31.

A downlink (DL) implies communication from the BS 20 to the MS 10, from the BS 20 to the RS 30, or from the RS 30 to the MS 10. An uplink (UL) implies communication from the MS 10 to the BS 20, from the MS 10 to the RS 30, or from the RS 30 to the BS 20. The UL and the DL between the BS and the RS are backhaul links. The UL and the DL between the BS and the MS or between the RS and the MS are access links. Hereinafter, for convenience of explanation, the UL between the BS and the RS is referred to as a 1st UL, the DL between the BS and the RS is referred to as a 1st DL, the UL between the RS and the MS is referred to as a 2nd UL, and the DL between the RS and the MS is referred to as a 2nd DL. The 1st DL and the 1st UL between the BS and the RS may operate in a frequency division duplex (FDD) mode or a time division duplex (TDD) mode. The 2nd DL and the 2nd UL between the RS and the MS may also operate in the FDD mode or the TDD mode.

Figure 2:
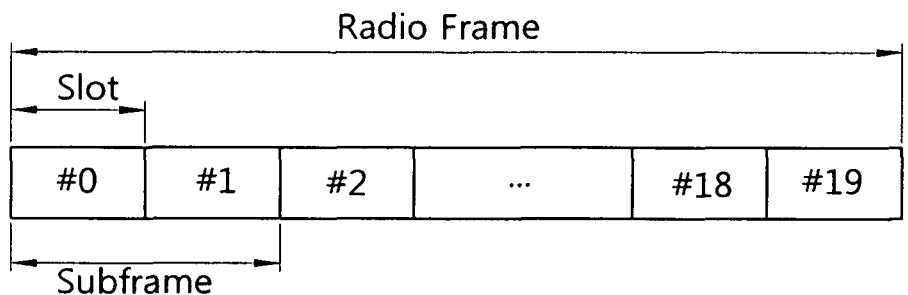
FIG. 2 shows a structure of a frequency division duplex (FDD) radio frame of a 3rd generation partnership project (3GPP) long term evolution (LTE) system.

FIG. 2 shows a structure of an FDD radio frame of a 3GPP LTE system. The section 4.1 of 3GPP TS 36.211 "Technical Specification; Evolved Universal Terrestrial Radio Access (E-UTRA); Physical Channels and Modulation (Release 8)" may be incorporated herein by reference. When in the FDD mode, DL transmission and UL transmission are divided in a frequency domain.

Referring to FIG. 2, the radio frame consists of 10 subframes, and one subframe consists of two slots. For example, one subframe may have a length of 1 millisecond (ms), and one slot may have a length of 0.5 ms. The slot may consist of 7 symbols in case of a normal cyclic prefix (CP), and may consist of 6 symbols in case of an extended CP.

A primary-synchronization channel (PSCH) and a secondary-synchronization channel (SSCH) may be allocated to some symbols of a 1st subframe and some symbols of a 6th subframe among DL subframes. A broadcast channel may also be allocated to some symbols of the 1st subframe and some symbols of the 6th subframe. When power is resumed in a power-off state or when an MS newly enters a cell, the MS performs an initial cell search Operation for synchronization with a BS. For this, the MS may be synchronized with the BS by receiving the PSCH and the SSCH from the BS, and may obtain information such as a cell identifier (ID) or the like. Thereafter, the MS may receive the broadcast channel from the BS to obtain intra-cell broadcast information. Meanwhile, the MS may receive a DL reference signal (RS) in the initial cell search operation to evaluate a DL channel condition.

The radio frame structure of FIG. 2 is for exemplary purposes only, and thus the number of subframes included in the radio frame or the number of slots included in the subframe may change variously.

Figure 3:
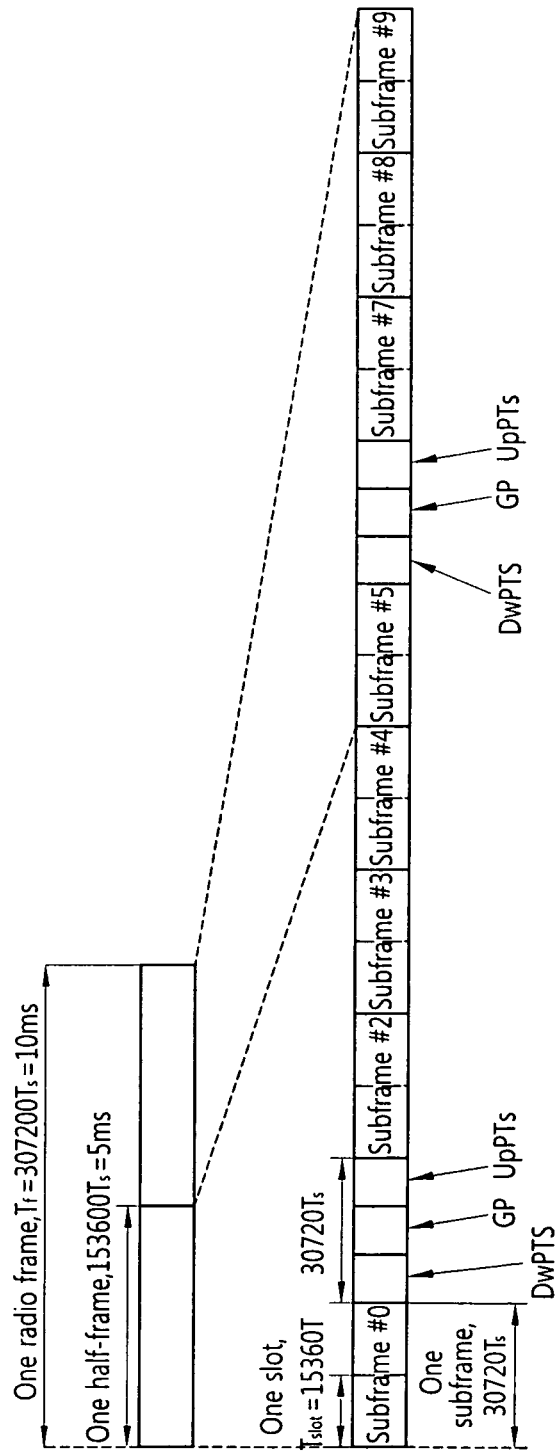
FIG. 3 shows a structure of a time division duplex (TDD) radio frame of a 3GPP LTE system.

FIG. 3 shows a structure of a TDD radio frame of a 3GPP LTE system. The section 4.2 of 3GPP TS 36.211 "Technical Specification; Evolved Universal Terrestrial Radio Access (E-UTRA); Physical Channels and Modulation (Release 8) may be incorporated herein by reference.

Referring to FIG. 3, a radio frame consists of two half-frames. The half-frame consists of five subframes.

A UL and a DL are identified in a subframe unit. A UL subframe and a DL subframe are separated by a switching point. The switching point is a region for separating the UL and the DL between the UL subframe and the DL subframe. The radio frame has at least one switching point. The switching point includes a downlink pilot time slot (DwPTS), a guard period (GP), and an uplink pilot time slot (UpPTS). The DwPTS is used for initial cell search, synchronization, or channel estimation. The UpPTS is used for channel estimation in the BS and for UL transmission synchronization of the MS. The GP is a guarding duration for removing interference generated in the UL due to a multi-path delay of a DL signal between the UL and the DL.

Table 2 shows a structure of a radio frame that can be configured according to an arrangement of a UL subframe and a DL subframe in the LTE TDD system.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

'D' denotes a DL subframe. 'U' denotes a UL subframe. 'S' denotes a special subframe. The special subframe indicates a switching point, that is, DwPTS + GP + UpPTS. In configurations 0 to 2 and a configuration 6, the UL and the DL are switched with a switching point period of 5 ms. In configurations 3 to 5, the DL and the UL are switched with a switching point period of 10 ms.

Table 3 shows a method of configuring the DwPTS, the GP, and the UpPTS considered in the LTE system. Ts denotes a sampling time, and is calculated by $1/(15000*2048)$ (sec).

TABLE 3

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Regarding a special subframe, 9 combinations are possible in case of a normal cyclic prefix, and 7 combinations are possible in case of an extended cyclic prefix.

Figure 4:
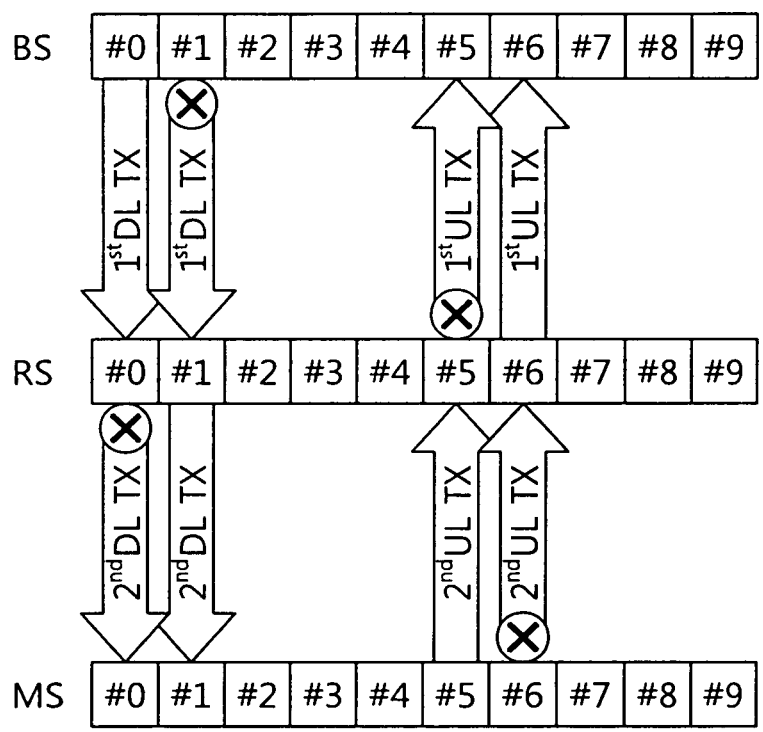
FIG. 4 shows an example of an operation of a time division multiplexing (TDM) RS.

FIG. 4 shows an example of an operation of a time division multiplexing (TDM) RS. In the following description, an MS is connected to the RS, and may be either an MS conforming to the LTE standard (hereinafter, LTE MS) or an MS conforming to the LTE-advance standard (hereinafter, LTE-A MS). It is assumed that 1st DL transmission and 2nd DL transmission use the same frequency band, and 1st UL transmission and 2nd UL transmission use the same frequency band. It is also assumed that DL transmission and UL transmission use different frequency bands.

Referring to FIG. 4, in a subframe #0, if the RS receives a signal from the BS through the 1st DL, the RS cannot transmit a signal to the MS through the 2nd DL. In a subframe #1, if the RS transmits a signal to the MS through the 2nd DL, the RS cannot receive a signal from the BS through the 1st DL. In a subframe #5, if the RS receives a signal from the MS through the 2nd UL, and the RS cannot transmit a signal to the BS through the 1st UL. In a subframe #6, if the RS transmits a signal to the BS through the 1st UL, the RS cannot receive a signal from the MS through the 2nd UL. As such, the RS cannot simultaneously transmit and receive signals by using the same frequency band.

Figure 5:
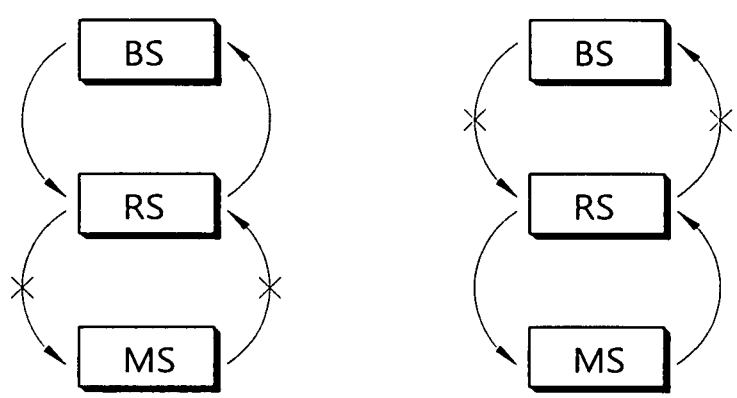
FIG. 5 shows an operation mode that can be used by an RS.
Figure 5:
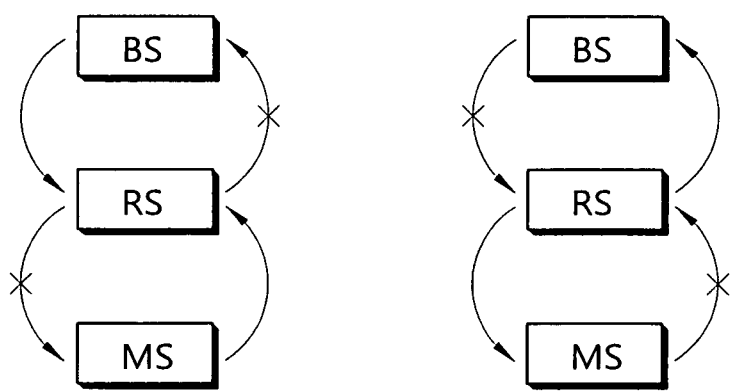

FIG. 5 shows an operation mode that can be used by an RS.

Referring to FIG. 5a, when a 1st DL and a 1st UL between a BS and an RS are activated, a 2nd DL and a 2nd UL between the RS and an MS are inactivated, and when the 2nd DL and the 2nd UL between the RS and the MS are activated, the 1st DL and the 1st UL between the BS and the RS are inactivated. This will be hereinafter referred to as a first mode.

Referring to FIG. 5b, when a 1st DL between a BS and an RS and a 2nd UL between the RS and an MS are activated, a 2nd DL between the RS and the MS and a 1st UL between the BS and the RS are inactivated, and when the 1st UL between the BS and the RS and the 2nd DL between the RS and the MS are activated, the 2nd UL between the RS and the MS and the 1st DL between the BS and the RS are inactivated. This will be hereafter referred to as a second mode.

As shown in FIG. 4 and FIG. 5, when the 1st DL is activated, the 2nd DL is inactivated. Therefore, an MS connected to the RS cannot receive a DL signal in a corresponding subframe. In this case, among MSs connected to the RS, there may exist an MS not knowing a fact that a DL signal cannot be received in a corresponding subframe. An example thereof is a conventional MS (e.g., LTE MS) designed without consideration of the RS. Such an MS may attempt to receive data in a corresponding frame and may perform channel quality measurement. Wrong channel quality measurement may produce an erroneous operation of the MS, resulting in generation of incorrect channel quality information. In addition thereto, a cell reconfiguration process may be performed, or a call may be completely terminated. Therefore, there is a need for a method capable of solving such a problem.

It is assumed that an MS enters a cell of the RS. In general, the MS is connected to the cell of the RS by performing a cell switching process or the like. Due to limited capability of the RS, there is a case where DL and/or UL transmissions cannot be achieved in a specific frame between the RS and the MS. In this case, an MS designed in consideration of the RS may understand an operation of the RS and thus recognize a specific subframe in which no transmission is performed, and then perform a predetermined procedure. However, the conventional MS designed without consideration of the RS cannot recognize the specific subframe in which no transmission is performed. Hereinafter, signaling of the RS for the conventional MS designed without consideration of the RS will be described.

Figure 6:
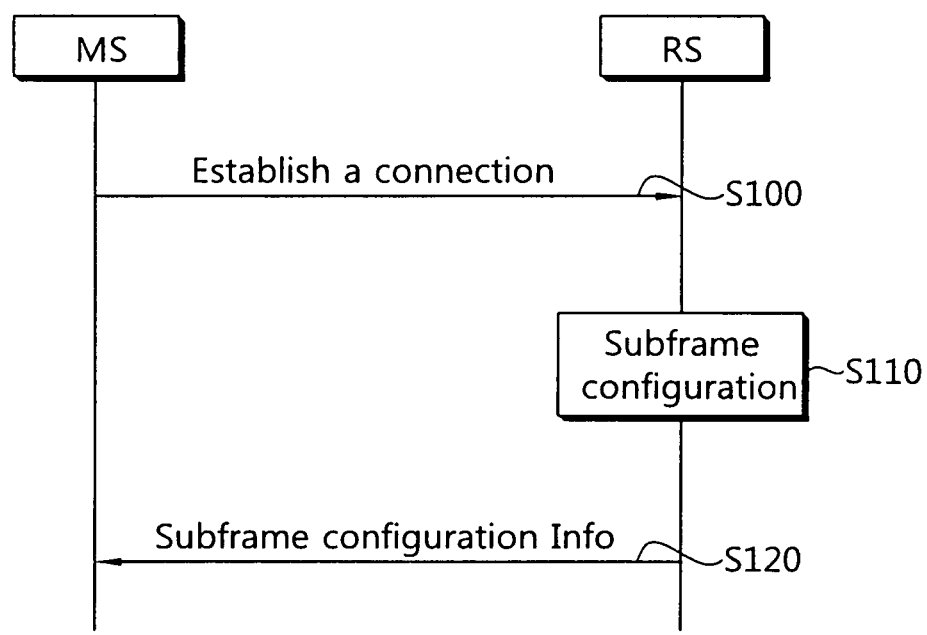
FIG. 6 is a flowchart showing a method of operating an RS in a wireless communication system employing the RS according to an embodiment of the present invention.

FIG. 6 is a flowchart showing a method of operating an RS in a wireless communication system employing the RS according to an embodiment of the present invention. Although signaling between the RS and an MS is exemplified herein for convenience of explanation, the same can also be equally applied between a BS and the RS.

Referring to FIG. 6, the MS is connected to a cell of the RS (step S100). Herein, the MS may be a conventional MS designed without consideration of the RS. For example, the MS may be an LTE MS. The MS may be subjected to cell modification before being connected to the RS. In this case, it is assumed that, if a 1st DL is activated in a specific subframe, a 2nd DL is inactivated, and if a 1st UL is activated in a specific subframe, a 2nd UL is inactivated.

The RS performs subframe configuration of the RS (step S110), and transmits subframe configuration information to the MS by signaling (step S120). For example, the subframe configuration information is expressed by the table blow.

TABLE 4

RelaySubframeConfiguration::=SEQUENCE(SIZE(1..maxRelayAllocations))OF

TABLE 4-continued

```
SEQUENCE{ radioframeAllocationPeriod ENUMERATED{n1,n2,n4,n8,n16,n32},
    radioframeAllocationOffset INTEGER{0..7},
        subframeAllocation      INTEGER{1..7})
```

As such, the RS may determine a radio frame allocation period (i.e., radioframeAllocationPeriod), a radio frame allocation offset (i.e., radioframeAllocationOffeset), a subframe allocation (i.e., subframeAllocation) etc., and may report information thereon to the MS. In this case, the RS may perform signaling to the MS through a physical layer or a higher layer. In addition, the RS may report the subframe configuration information to the MS by expressing the subframe configuration information in a bitmap format.

In addition thereto, the RS may determine to activate or inactivate the 2nd DL and/or the 2nd UL in the specific subframe, and may report information thereon to the MS. The RS may determine to activate or inactivate the 1st DL and/or the 1st UL in the specific subframe, and may report information thereon to the MS. The specific subframe may be an odd-numbered subframe or an even-numbered subframe.

The RS may consider several aspects to configure the specific subframe. For example, the RS has to receive a synchronization channel (SCH) and/or a broadcast channel (BCH) from the BS. Therefore, it may be determined that the 2nd DL is inactivated in a specific subframe in which the SCH and/or the BCH are received. The specific subframe in which the SCH and/or the BCH are received may be a subframe #0 and/or a subframe #5. More specifically, when conforming to the LTE standard, the SCH is located in some symbols of the subframe #0 and the subframe #5 and a physical broadcast channel (PBCH) is located in some symbols of the subframe #0. A dynamic broadcast channel (D-BCH) transmitted in a format of a system information block (SIB) may be located in the subframe #0 and the subframe #5, or may be located in any one of the subframe #0 and the subframe #5 of an even-numbered radio frame. However, such locations of the SCH and the BCH are exemplary purposes only, and thus may change depending on a communication system.

Accordingly, an error caused by wrong channel quality measurement can be prevented when the RS cannot transmit a signal to the MS while receiving a signal from the BS by using the same frequency band. In addition, hybrid automatic repeat request (HARQ) defined by the LTE standard and HARQ defined by the LTE-A standard can normally operate in an error-free manner without having a significant change. That is, backward compatibility can be ensured.

Meanwhile, due to limited transmission/reception capability of the RS, the RS suffers significant restriction on link configuration. In general, the RS cannot simultaneously receive and transmit data over the same frequency. Accordingly, a situation may occur in which data cannot be transmitted in a specific subframe. A characteristic of the RS has an effect on an HARQ operation. Therefore, the specific subframe can be defined as a blank subframe. To overcome a problem caused by the limited capability of the RS, it is proposed to introduce an RS capable of supporting all operations or only some combinations of the operations described in FIG. 7 to FIG. 11.

Figure 7:
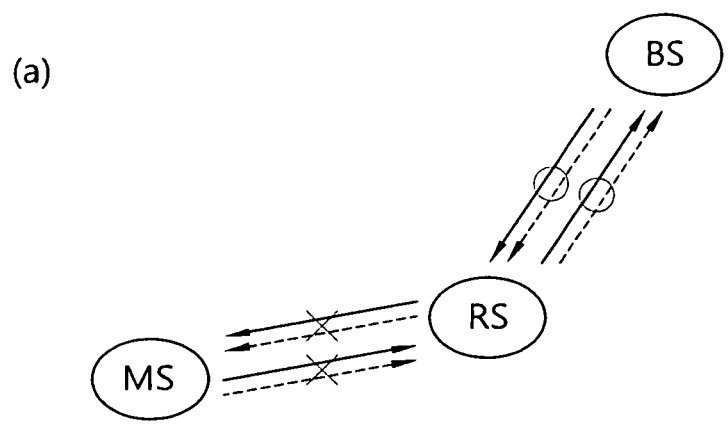
FIG. 7 shows an operation of an RS according to an embodiment of the present invention.
Figure 7:
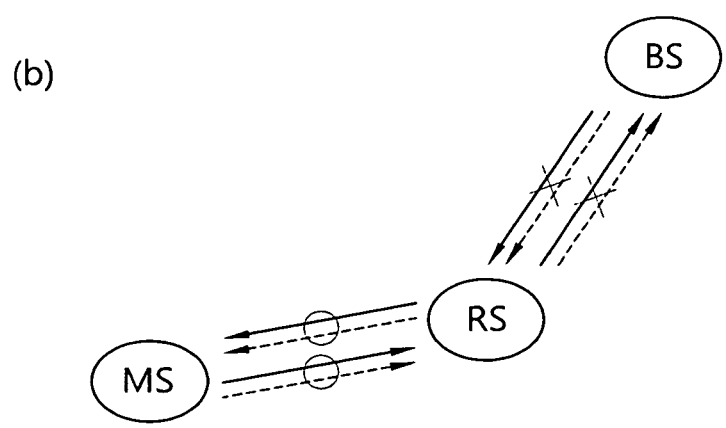

FIG. 7 shows an operation of an RS according to an embodiment of the present invention. An arrow direction indicates a transmission direction. A solid line indicates data transmission. A dotted line indicates control signal transmission. For example, a channel for transmitting data is a shared channel (SCH), and a channel for transmitting a control signal is a control channel (CCH).

Referring to FIG. 7a, when a 1st DL and a 1st UL between a BS and an RS are activated, a 2nd DL and a 2nd UL between the RS and an MS are inactivated. Referring to FIG. 7b, when a 2nd DL and a 2nd UL between an RS and an MS are activated between, a 1st DL and a 1st UL between a BS and the RS are inactivated. As such, a link between the BS and the RS and a link between the MS and the RS can be alternately activated. For convenience of explanation, a method of FIG. 7a will be referred to as a first sub-mode, and a method of FIG. 7b will be referred to as a second sub-mode. Considering that an LTE system uses an OFDMA scheme in DL transmission and uses an SC-FDMA scheme in UL transmission, it is preferable that the first sub-mode and the second sub-mode are alternately operated according to a condition of the RS. When the first sub-mode and the second sub-mode are alternately operated, such an operation mode is referred to as a first mode.

FIG. 8 to FIG. 11 show operations of an RS according to an embodiment of the present invention. An arrow direction indicates a transmission direction. A solid line indicates a channel for transmitting data. A dotted line indicates a channel for transmitting a control signal. For example, the channel for transmitting data is a shared channel (SCH), and the channel for transmitting a control signal is a control channel (CCH). The RS may be an FDD-type RS in which DL transmission and UL transmission use different frequency bands. In addition, when the RS supports an LTE or LET-A system, the RS may be an RS capable of simultaneously demodulating signals modulated using OFDMA and SC-FDMA. As a result, a time delay is minimized, and a degree of freedom increases in system management. An RS based on the embodiment of the present invention supports an operation of FIG. 7, and may support all operations or some combinations of the operations of FIG. 8 to FIG. 11. Accordingly, the RS based on the embodiment of the present invention can determine an RS link configuration differently depending on a channel condition or a system condition.

Figure 8:
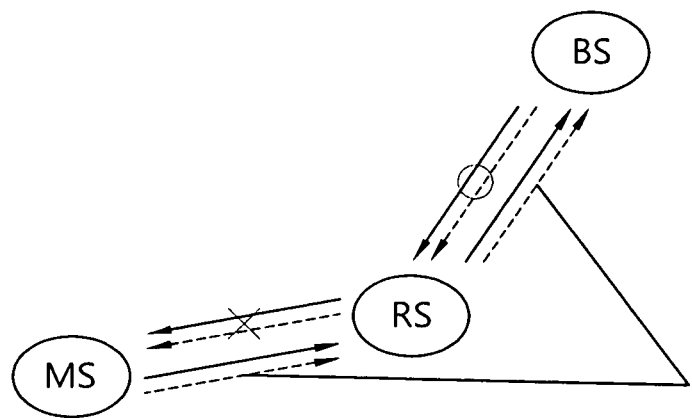
FIG. 8 to FIG. 11 show operations of an RS according to an embodiment of the present invention.

Referring to FIG. 8, when a 1st DL between a BS and an RS is activated, a 2nd DL between the RS and an MS is inactivated. In this case, according to the channel condition or the system condition, a 1st UL between the BS and the RS and a 2nd UL between the RS and the MS can be selectively activated.

Figure 9:
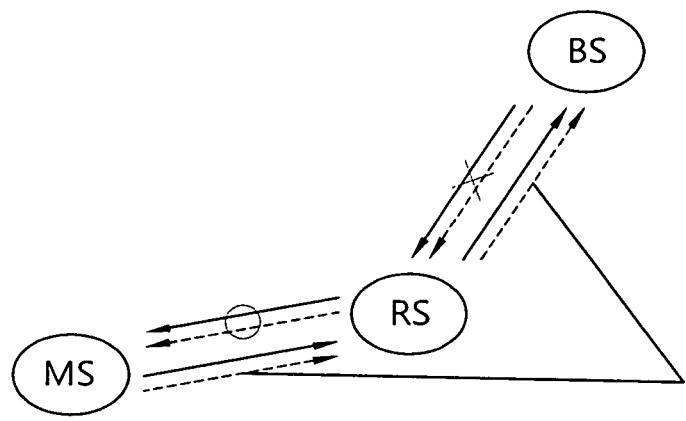

Referring to FIG. 9, when a 2nd DL between an RS and an MS is activated, a 1st DL between a BS and the RS is inactivated. In this case, according to the channel condition or the system condition, a 2nd UL between the RS and the MS or a 1st UL between the BS and the RS can be selective activated.

Figure 10:
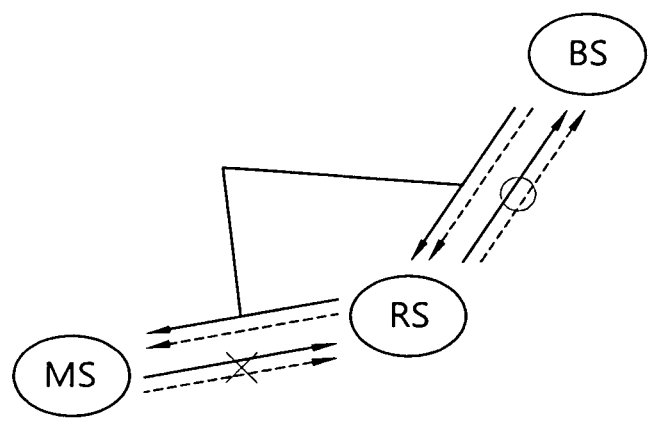

Referring to FIG. 10, when a 1st UL between a BS and an RS is activated, a 2nd UL between the RS and an MS is inactivated. In this case, according to the channel condition or the system condition, a 1st DL between the BS and the RS or a 2nd DL between the RS and the MS can be selectively activated.

Figure 11:
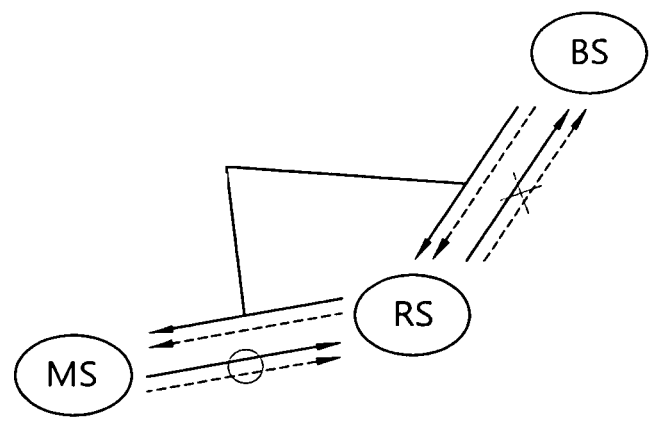

Referring to FIG. 11, when a 2nd UL between an RS and an MS is activated, a 1st UL between a BS and the RS is inactivated. In this case, according to the channel condition or the system condition, a 1st DL between the BS and the RS or a 2nd DL between the BS and the RS can be selectively activated.

The method exemplified in FIG. 8 to FIG. 11 selects two links from three possible links according to a condition. Although some parts of the method of FIG. 8 to FIG. 11 are identical to those of the method of FIG. 7, the identical parts are separately described herein for ideal mode identification and for convenience of explanation.

To distinguish from the example of FIG. 7, a case where the 1st DL between the BS and the RS and the 2nd UL between the RS and the MS are simultaneously activated is referred to as a third sub-mode. In addition, a case where the 1st UL between the BS and the RS and the 2nd DL between the RS and the MS are simultaneously activated is referred to as a fourth sub-mode. It is preferable that the third sub-mode and the fourth sub-mode are alternately operated according to a condition of the RS. As such, when the third sub-mode and the fourth sub-mode are alternately operated, such an operation mode is referred to as a second mode.

The aforementioned operation mode of the RS can also extensively apply to HARQ. In this case, it can be assumed that the BS and the RS have separate scheduling functions, and the HARQ is performed between the RS and the MS in an independent manner to some extent. According to the LTE standard, the HARQ has a period of 8 subframes. That is, a difference from an initial transmission time to a retransmission time is 8 subframes. Since the HARQ is synchronous HARQ, this value is a fixed value. Such a restriction also directly applies to a UL between the BS and the RS.

Figure 12:
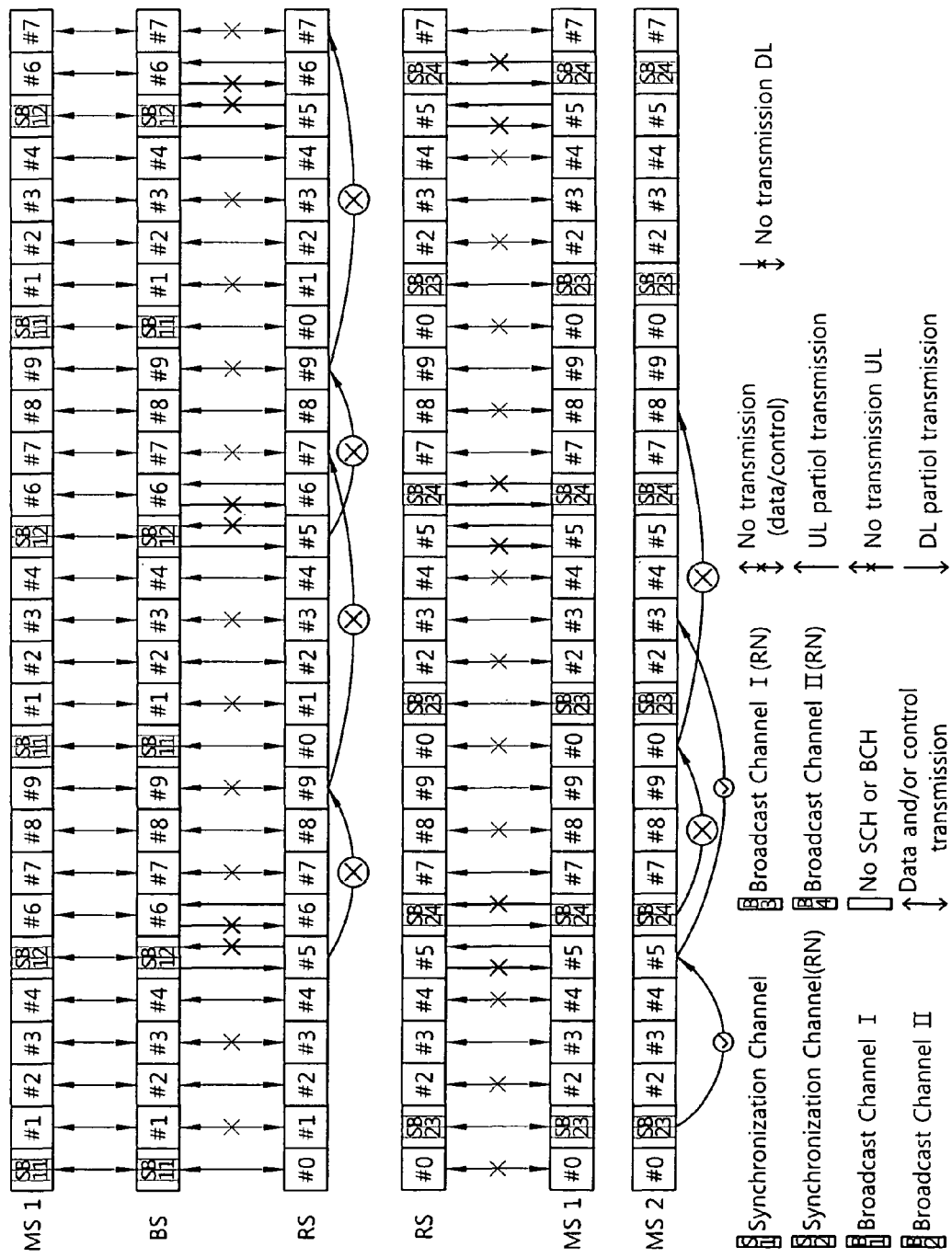
FIG. 12 shows a subframe configuration of an RS according to an embodiment of the present invention.

FIG. 12 shows a subframe configuration of an RS according to an embodiment of the present invention. An MS may be an LTE-A MS (i.e., MS 1) or an LTE MS (i.e., MS 2). The MS may be connected to the RS or a BS. It is assumed that the LTE MS can operate by being connected to the RS. In this case, a subframe index between the BS and the RS and a subframe index between the RS and the MS may be indexed in an identical or different manner. It is exemplified in the present invention that the subframe indices are indexed in an identical manner. If the subframe index of the BS is indexed differently from the subframe index of the RS, the BS and the RS can share an index difference.

Referring to FIG. 12, in a subframe #0, a 1st UL and a 1st DL between the BS and the RS are activated. In this case, the RS can receive SCH information and/or BCH information from the BS through the 1st DL, and can transmit a signal to the BS through the 1st UL. Due to limited capability of the RS, in the subframe #0, a 2nd UL and a 2nd DL between the RS and the MS are inactivated. Upon receiving the SCH information in the subframe #0, the RS is synchronized with the BS. Upon receiving the BCH information, the RS prepares to transmit the BCH information to an MS connected to the RS.

Next, in a subframe #1, the 2nd UL and the 2nd DL between the RS and the MS are activated. In this case, the RS can transmit the BCH information received from the BS in the subframe #0 to the MS through the 2nd DL, and can receive a signal from the MS through the 2nd UL. In the subframe #1, the RS can transmit the SCH information to the MS. The SCH information transmitted by the RS to the MS may be SCH information generated by the RS itself.

Next, in a subframe #5, the 1st DL between the BS and the RS and the 2nd UL between the RS and the MS are activated. There is a case where the BS must transmit specific control information to the RS in a specific subframe. For example, in the subframe #5, the BS transmits SCH information and D-BCH information to the RS. Therefore, the 1st DL between the BS and the RS is activated, and the 2nd DL between the BS and the RS is inactivated. In this case, the 1st UL between the BS and the RS or the 2nd UL between the RS and the MS can be selectively activated. However, the 2nd UL between the RS and the MS has to be activated so that synchronous HARQ is performed for data transmission between the RS and the MS The 1st DL activated in the subframe #5 between the BS and the RS may transmit only control information or may transmit both the control information and data. When the control information and the data are transmitted, even if a UL scheduling grant is delivered, the data cannot be transmitted through the 1st UL in a subframe #9. Therefore, it is assumed that the 1st DL activated in the subframe #5 between the BS and the RS transmits only the control information. To avoid such a restriction, an HARQ process between the BS and the RS may be newly designed. For example, such a problem can be solved if data is transmitted after 3 or 5 subframes elapse from a time when the UL scheduling grant is received and if acknowledgment (ACK)/Non-acknowledgement (NACK) is received after 8 subframes elapse. That is, the problem can be solved if a subframe capable of transmitting data is configured to an even-numbered subframe. In this case, the even-numbered subframe is for exemplary purposes only, and thus the subframe may also be configured to an odd-numbered subframe, a subframe indexed with a multiple of k, a subframe group determined by a pre-defined pattern, etc. Information on the pre-defined pattern can be shared by signaling between the BS and the RS.

Next, in a subframe #6, the 2nd DL between the RS and the MS and the 1st UL between the BS and the RS are activated. In the subframe #6, the RS transmits SCH information and/or BCH information to the MS. Therefore, the 2nd DL between the RS and the MS is activated, and the 1st DL between the BS and the RS is inactivated. In this case, the 1st UL between the BS and the RS or the 2nd UL between the RS and the MS can be selectively activated. However, the 1st UL between the BS and the RS is preferably activated so that synchronous HARQ is performed for data transmission between the BS and the RS.

As such, a link between the BS and the RS and a link between the RS and the MS may be alternately activated according to a specific rule. For example, the link between the BS and the RS may be activated in an odd-numbered subframe, and the link between the RS and the MS may be activated in an even-numbered subframe. The link between the BS and the RS may be activated in the even-numbered subframe, and the link between the RS and the MS may be activated in the odd-numbered subframe. Alternatively, the link between the RS and the MS may be activated in a subframe indexed with a multiple of k. Alternatively, the link between the RS and the MS may be activated in a subframe corresponding to a pre-defined pattern. Accordingly, HARQ for data transmission between the RS and the MS can be performed using an activated subframe. For example, it is assumed that the link between the RS and the MS is activated in an odd-numbered subframe. When the RS transmits a UL scheduling grant to the MS through the 2nd DL in the subframe #1, the MS transmits data to the RS through the 2nd UL (e.g., PUSCH channel) in the subframe #5, that is, after four subframes elapse. In addition, in the subframe #9, that is, after four subframes elapse from the subframe #5, the RS transmits ACK/NACK to the MS through the 2nd DL. When data retransmission is required, the MS transmits data to the RS through the 2nd UL in a subframe #3 of a next frame, that is, after four subframes elapse from the subframe #9. In a subframe next to the subframe in which the 2nd DL or the 2nd UL between the RS and the MS is activated, the 1st DL or the 1st UL between the BS and the RS can be activated.

Figure 13:
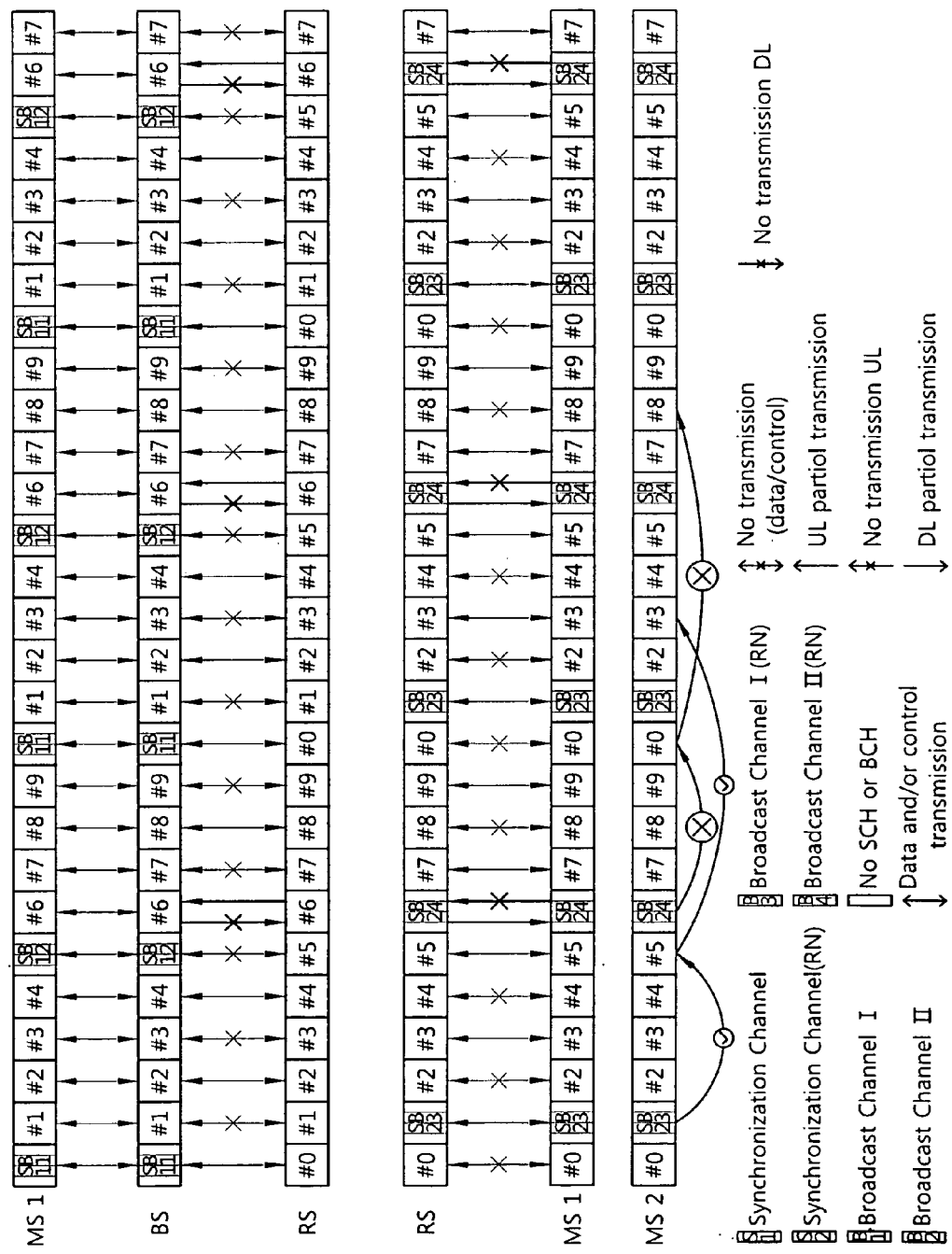
FIG. 13 shows a subframe configuration of an RS according to another embodiment of the present invention.

FIG. 13 shows a subframe configuration of an RS according to another embodiment of the present invention. In this case, a subframe index between a BS and the RS and a subframe index between the RS and an MS may be indexed in an identical or different manner. It is exemplified in the present invention that the subframe indices are indexed in an identical manner. If the subframe index of the BS is indexed differently from the subframe index of the RS, the BS and the RS can share an index difference.

Referring to FIG. 13, in a subframe #0, a 1st UL and a 1st DL between the BS and the RS are activated. In this case, the RS can receive SCH information and/or BCH information from the BS through the 1st DL, and can transmit a signal to the BS through the 1st UL. Due to limited capability of the RS, in the subframe #0, a 2nd UL and a 2nd DL between the RS and the MS are inactivated. Upon receiving the SCH information in the subframe #0, the RS is synchronized with the BS. Upon receiving the BCH information, the RS prepares to transmit the BCH information to an MS connected to the RS.

Next, in a subframe #1, the 2nd UL and the 2nd DL between the RS and the MS are activated. In this case, the RS can transmit the BCH information received from the BS in the subframe #0 to the MS through the 2nd DL, and can receive a signal from the MS through the 2nd UL. In the subframe #1, the RS can transmit the SCH information to the MS. The SCH information transmitted by the RS to the MS may be SCH information generated by the RS itself.

Unlike in FIG. 12, it is assumed that the BS does not have to transmit specific control information to the RS in a subframe #5. Therefore, in the subframe #5, the 2nd DL and the 2nd UL between the RS and the MS are activated, and the 1st DL and the 1st UL between the BS and the RS are inactivated.

Next, in a subframe #6, the 2nd DL between the RS and the MS and the 1st UL between the BS and the RS are activated. In the subframe #6, the RS transmits control information to the MS. The control information may be SCH information generated by the RS. Therefore, the 2nd DL between the RS and the MS is activated, and the 1st DL between the BS and the RS is inactivated. In this case, the 1st UL between the BS and the RS or the 2nd UL between the RS and the MS can be selectively activated. However, the 1st UL between the BS and the RS is preferably activated so that synchronous HARQ is performed for data transmission between the BS and the RS.

As such, a link between the BS and the RS and a link between the RS and the MS may be alternately activated according to a specific rule. For example, the link between the BS and the RS may be activated in an odd-numbered subframe, and the link between the RS and the MS may be activated in an even-numbered subframe. The link between the BS and the RS may be activated in the even-numbered subframe, and the link between the RS and the MS may be activated in the odd-numbered subframe. Alternatively, the link between the RS and the MS may be activated in a subframe indexed with a multiple of k. Alternatively, the link between the RS and the MS may be activated in a subframe corresponding to a pre-defined pattern. Accordingly, HARQ for data transmission between the RS and the MS can be performed using an activated subframe.

When the 1st DL is activated in a certain subframe, the 2nd DL is inactivated in that subframe. There may be a channel that must be transmitted from the RS to the MS through the 2nd DL in a specific subframe, preferably, a specific control channel. The channel that must be transmitted to the MS may be at least one of an SCH, a BCH, and a paging channel. Preferably, the channel that must be transmitted to the MS may be at least one of a primary SCH, a secondary SCH, a physical BCH, a dynamic BCH (D-BCH), and a paging channel. Therefore, by properly configuring a subframe of the RS, the subframe can be configured so that the 1st DL is activated for some of the remaining subframes other than the specific subframe in which the channel that must be transmitted to the MS through the 2nd DL exists. For example, if the specific subframe is subframes #0, #4, #5, and #9 of the RS, a subframe in which the 1st DL may be activated, that is, a subframe in which the 2nd DL may be inactivated, is subframes #1, #2, #3, #6, #7, and #8. In this case, the subframe may be configured by considering an acknowledgement (ACK)/non-acknowledgement (NACK) transmission time, a data retransmission time, etc., for data transmission. A delay from a DL transmission time to a UL transmission time, a delay from the UL transmission time to the DL transmission time, or the like may be further considered.

Figure 14:
Figure 14:

FIG. 14 and FIG. 15 show link usage efficiency depending on the number of HARQ processes when a subframe is configured according to an embodiment of the present invention.

An "HP" column indicates a subframe in which an HARQ process can be successfully performed. When taking an HP1 for example, in a subframe #0, data is initially transmitted from an RS to an MS through a 2nd DL. In a subframe #4, an ACK/NACK signal is transmitted from the MS to the RS through a 2nd UL. In a subframe #8, that is, after 8 subframes elapse from initial transmission, data is retransmitted (or initially transmitted) from the RS to the MS through the 2nd DL. A "Relay DL Tx" column indicates whether the 2nd DL from the RS to the MS is used. A "Relay UL Rx" column indicates whether the 2nd UL from the MS to the RS is used. In the "Relay DL Tx" column and the "Relay UL Rx" column, "1" indicates use, and "0" indicates non-use. A "Link Utilization (DL or UL)" column indicates a usage rate of the 2nd DL or the 2nd UL, and is expressed by "1" when at least one of the 2nd DL and the 2nd UL is used, and is expressed by "0" when none of them is used. A "Link Utilization (DL and UL)" column indicates a usage rate of the 2nd DL and/or the 2nd UL, and is expressed by "2" when both of the 2nd DL and the 2nd UL are used, is expressed by "1" when any one of the 2nd DL and the 2nd UL is used, and is expressed by "0" when none of them is used. A "(n)" column and a "(n+4)" column indicate a response transmitted from the MS to the RS through the 2nd UL in a subframe #n+4 with respect to a control channel transmitted from the RS to the MS through the 2nd DL in a subframe #n. It is assumed herein that a time required for the response is 4 subframes.

Table 5 shows a result obtained by analyzing link usage efficiency based on the example of FIG. 14. Table 6 shows a result obtained by analyzing link usage efficiency based on the example of FIG. 15.

TABLE 5

| | | |
|---|---|---|
| RS to MS | 1st Downlink Occupancy (No.) | 28 |
| | 1st Downlink Occupancy (%) | 70 |
| | 2nd Downlink availability(%) | 30 |
| MS to RS | 1st Uplink Occupancy (No.) | 28 |
| | 1st Uplink Occupancy (%) | 70 |
| | 2nd Uplink availability(%) | 30 |
| DL or UL | 1st Downlink and/or 1st Uplink Occupancy (No.) | 40 |
| | 1st Downlink and/or 1st Uplink Occupancy (%) | 100 |
| | 2nd Downlink and 2nd Uplink Occupancy (%) | 0 |
| DL and UL | 1st Downlink and 1st Uplink Occupancy (No.) | 16 |
| | 1st Downlink or 1st Uplink Occupancy (No.) | 24 |
| | 1st Downlink or 1st Uplink Occupancy (%) | 70 |

TABLE 5-continued

| | 2nd Downlink and/or 2nd Uplink Occupancy (%) | 30 |
|---|---|---|

TABLE 6

| RS to MS | 1st Downlink Occupancy (No.) | 28 |
|---|---|---|
| | 1st Downlink Occupancy (%) | 70 |
| | 2nd Downlink availability(%) | 30 |
| MS to RS | 1st Uplink Occupancy (No.) | 28 |
| | 1st Uplink Occupancy (%) | 70 |
| | 2nd Uplink availability(%) | 30 |
| DL or UL | 1st Downlink and/or 1st Uplink Occupancy (No.) | 32 |
| | 1st Downlink and/or 1st Uplink Occupancy (%) | 80 |
| | 2nd Downlink and 2nd Uplink Occupancy (%) | 20 |
| DL and UL | 1st Downlink and 1st Uplink Occupancy (No.) | 24 |
| | 1st Downlink or 1st Uplink Occupancy (No.) | 8 |
| | 1st Downlink or 1st Uplink Occupancy (%) | 70 |
| | 2nd Downlink and/or 2nd Uplink Occupancy (%) | 30 |

Referring to FIG. 14 and Table 5, when data is transmitted in each subframe from the RS to the MS through the 2nd DL in subframes #0 to #3, ACK/NACK is transmitted in each subframe from the MS to the RS through the 2nd UL in subframes #4 to #7. Data is transmitted in each subframe from the RS to the MS through the 2nd DL in subframes #8 to #11, or the data transmitted in the subframes #0 to #3 is retransmitted. Accordingly, there is no subframe in which the RS operates in a first mode where the 1st UL and the 1st DL between the BS and the RS are simultaneously activated.

Referring to FIG. 15 and Table 6, when data is transmitted from the RS to the MS through the 2nd DL in subframes #0, #2, #4, and #6, ACK/NACK is transmitted from the MS to the RS through the 2nd UL in subframes #4, #6, #8, and #10. Data is transmitted from the RS to the MS through the 2nd DL in subframes #8, #10, #12, and #14, or the data transmitted in the subframes #0, #2, #4, and #6 is retransmitted. 20% of all subframes are used for neither the 2nd DL nor the 2nd UL. Therefore, as for the 20% of all subframes, the RS can operate in the first mode where the 1st DL and the 1st UL are simultaneously activated.

Link usage efficiency can be increased by configuring a subframe as shown in FIG. 15. That is, if the "Link Utilization (DL and UL)" column is "0" or "2", the RS can operate in the first mode where the 1st DL and the 1st UL are simultaneously activated or the 2nd DL and the 2nd UL are simultaneously activated. If the "Link Utilization (DL and UL)" column is "1", the RS can operate in a second mode where the 1st DL and the 2nd UL are simultaneously activated or the 2nd DL and the 1st UL are simultaneously activated. For example, while operating in the first mode, the RS may perform mode switching to the second mode according to a specific situation. Examples of the specific situation requiring mode switching include a case where there is a control signal that must be transmitted in a specific subframe, a case where mode switching is necessary to perform HARQ without difficulty, etc. In this case, an operation mode of the RS may be switched by the RS itself or may be switched by separate signaling with the BS or the MS. When the RS performs separate signaling with the BS or the MS, the signaling process may indicate a specific subframe in which the operation mode of the RS is switched or may indicate a rule of switching the operation mode. Alternatively, signaling may be performed with a specific period.

Collision can be reduced between a backhaul link and an access link by configuring a subframe as shown in FIG. 15. That is, in FIG. 15, among 8 subframes, even-numbered subframes are allocated for the access link, and thus odd-numbered subframes can be allocated for the backhaul link. Alternatively, the even-numbered subframes may be allocated for the backhaul link, and the odd-numbered subframes may be allocated for the access link. Unlike this, when subframes are allocated for the backhaul link and the access link in a different ratio, collision may occur between the backhaul link and the access link. For example, when 5 subframes out of the 8 subframes are allocated for the backhaul, the backhaul link uses all of 4 even-numbered (or odd-numbered) subframes out of the 8 subframes, and additionally uses the odd-numbered (or even-numbered) subframes. In this case, the backhaul link may collide with the access link. Therefore, subframes may be alternately allocated in a ratio of 5:5 for the backhaul and the access link, thereby avoiding collision between the backhaul and the access link. In this case, a configuration of subframes allocated for the backhaul and the access link may be received from the BS by signaling. For example, the BS and the RS may share a configuration such as a ratio of subframes allocated for the backhaul and the access link (e.g., backhaul link:access link=5:5, 6:4, or 7:3), an allocation pattern of the subframes, etc., and the BS may report an index for the configuration to the RS by performing signaling.

Figure 16:
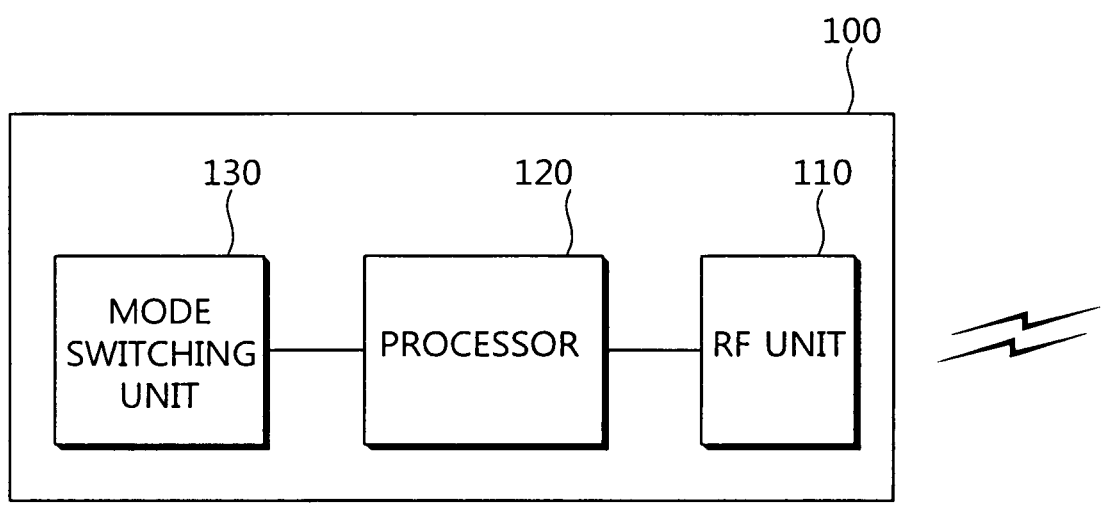
FIG. 16 is a block diagram showing an RS according to an embodiment of the present invention.

FIG. 16 is a block diagram showing an RS according to an embodiment of the present invention.

Referring to FIG. 16, an RS 100 includes a radio frequency (RF) unit 110 transmitting and receiving a radio signal, a processor 120, and a mode switching unit 130. The processor 120 is configured to operate in a first mode or a second mode. The first mode includes a first sub-mode for simultaneously activating a 1st DL and a 1st UL between a BS and the RS and a second sub-mode for simultaneously activating a 2nd DL and a 2nd UL between the RS and an MS. The second mode includes a third sub-mode for simultaneously activating the 1st DL between the BS and the RS and the 2nd UL between the RS and the MS and a fourth sub-mode for simultaneously activating the 1st UL between the BS and the RS and the 2nd DL between the RS and the MS. The mode switching unit 130 is configured so that mode switching is performed between the first mode and the second mode by considering a specific subframe.

The aforementioned functions can be executed by processors such as microprocessors, controllers, microcontrollers, application specific integrated circuits (ASICs) and so on according to software or program codes coded to execute the functions. The design, development and implementation of the codes are obvious to those skilled in the art.

While the present invention has been particularly shown an described with reference to exemplary embodiments thereof, it will be understood by those of ordinary skill in the art that various changes in form and details may be made therein without departing from the spirit and scope of the present invention as defined by the following claims.

What is claimed is:

1. A method of operating a relay station (RS) in a wireless communication system, the method comprising:
    receiving subframe configuration information through a higher layer from a base station (BS); and
    configuring a downlink subframe based on the subframe configuration information,
    wherein a first downlink transmission, from the BS to the RS, and a second downlink transmission, from the RS to an user equipment (UE), are performed at different time and in a downlink frequency band and,
    wherein a first uplink transmission, from the RS to the BS, and a second uplink transmission, from the UE to the RS, are performed at different time and in an uplink frequency band, and wherein the downlink subframe is configured for receiving a signal by the first downlink transmission, and wherein when a frame comprises 10 downlink subframes, the downlink subframe is configured per a specific number of subframes with an exception of a first downlink subframe, a fifth downlink subframe, a sixth downlink subframe and a tenth downlink subframe of the frame.

2. The method of claim 1, wherein the first downlink subframe, the fifth downlink subframe, the sixth downlink subframe and the tenth downlink subframe in the frame are used for transmitting at least one of a synchronization channel, a broadcast channel, and a paging channel.

3. The method of claim 1, wherein the subframe configuration information comprises a bitmap used for indicating the downlink subframe.

4. The method of claim 1, wherein the RS performs at least one hybrid automatic repeat request (HARQ) process regarding the UE.

5. The method of claim 4, wherein each HARQ process starts every two or more subframes.

6. A relay station (RS) comprising:
a radio frequency (RF) unit for transmitting and receiving a radio signal; and
a processor coupled to the RF unit,
wherein the processor receives subframe configuration information through a higher layer from a base station (BS); and
configures a downlink subframe based on the subframe configuration information,
wherein a first downlink transmission, from the BS to the RS, and a second downlink transmission, from the RS to an user equipment (UE), are performed at different time and in a downlink frequency band and,
wherein a first uplink transmission, from the RS to the BS, and a second uplink transmission, from the UE to the RS, are performed at different time and in an uplink frequency band, and
wherein the downlink subframe is configured for receiving a signal by the first downlink transmission, and
wherein when a frame comprises 10 downlink subframes, the downlink subframe is configured per a specific number of subframes with an exception of a first downlink subframe, a fifth downlink subframe, a sixth downlink subframe and a tenth downlink subframe of the frame.

7. The method of claim 1, wherein the frame comprises 10 downlink subframes in the downlink frequency band and 10 uplink subframes in the uplink frequency band.

* * * * *